United States Patent
Tsuchiya

(10) Patent No.: US 11,021,081 B2
(45) Date of Patent: Jun. 1, 2021

(54) OCCUPANT DETECTION DEVICE, OCCUPANT DETECTION SYSTEM, AND OCCUPANT DETECTION METHOD

(71) Applicant: Mitsubishi Electric Corporation, Tokyo (JP)

(72) Inventor: Jiro Tsuchiya, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/770,846

(22) PCT Filed: Jan. 25, 2018

(86) PCT No.: PCT/JP2018/002327
§ 371 (c)(1),
(2) Date: Jun. 8, 2020

(87) PCT Pub. No.: WO2019/146043
PCT Pub. Date: Aug. 1, 2019

(65) Prior Publication Data
US 2020/0398699 A1  Dec. 24, 2020

(51) Int. Cl.
*B60N 2/00* (2006.01)
*G06T 7/73* (2017.01)
(Continued)

(52) U.S. Cl.
CPC ............ *B60N 2/002* (2013.01); *B60W 50/14* (2013.01); *G01G 19/414* (2013.01); *G06F 21/32* (2013.01); *G06K 9/00838* (2013.01); *G06K 9/6215* (2013.01); *G06T 7/74* (2017.01); *G08B 21/0236* (2013.01); *G08B 21/22* (2013.01); *G08B 21/24* (2013.01); *B60W 2050/146* (2013.01);
(Continued)

(58) Field of Classification Search
CPC combination set(s) only.
See application file for complete search history.

(56) References Cited

U.S. PATENT DOCUMENTS

| 9,919,648 B1* | 3/2018 | Pedersen | ................ G08G 1/048 |
| 2004/0186642 A1* | 9/2004 | Basir | ................ B60R 21/01542 |
| | | | 701/45 |

(Continued)

FOREIGN PATENT DOCUMENTS

| JP | 2000-181687 A | 6/2000 |
| JP | 2005-231539 A | 9/2005 |
| JP | 2013-252863 A | 12/2013 |

*Primary Examiner* — Thomas S McCormack
(74) *Attorney, Agent, or Firm* — Birch, Stewart, Kolasch & Birch, LLP

(57) ABSTRACT

An occupant detection device includes: a face area detecting unit for executing a process of detecting a plurality of face areas corresponding to a plurality of faces in an image captured by a camera for capturing an image of a vehicle interior; a first determination unit for determining whether or not, among a plurality of seat areas corresponding to a plurality of seats in the captured image, there is a seat area including two or more face areas; a second determination unit for determining whether or not a duration time of a state where there is a seat area including two or more face areas has exceeded a reference time; and a warning output control unit for executing control for outputting a warning when the duration time exceeds the reference time.

7 Claims, 17 Drawing Sheets

(51) Int. Cl.
  *B60W 50/14*      (2020.01)
  *G01G 19/414*     (2006.01)
  *G06F 21/32*      (2013.01)
  *G06K 9/00*       (2006.01)
  *G06K 9/62*       (2006.01)
  *G08B 21/02*      (2006.01)
  *G08B 21/22*      (2006.01)
  *G08B 21/24*      (2006.01)
(52) U.S. Cl.
  CPC .............. *G06T 2207/30201* (2013.01); *G06T 2207/30268* (2013.01)

(56) References Cited

U.S. PATENT DOCUMENTS

2010/0087990 A1*  4/2010  Allen ................ B60R 21/01538
                                                            701/45
2018/0144204 A1*  5/2018  Miyamoto ................ G06T 7/50
2018/0150707 A1*  5/2018  Fujii .................. G06K 9/00228
2020/0171977 A1*  6/2020  Jales Costa ............ B60N 2/002

* cited by examiner

OCCUPANT DETECTION DEVICE, OCCUPANT DETECTION SYSTEM, AND OCCUPANT DETECTION METHOD

TECHNICAL FIELD

The present invention relates to an occupant detection device, an occupant detection system, and an occupant detection method.

BACKGROUND ART

Conventionally, a technique of detecting an occupant in a vehicle has been developed. For example, Patent Literature 1 discloses a technique of detecting an occupant using a camera for capturing an image of a vehicle interior. Patent Literature 2 discloses a technique of detecting an occupant using a weight sensor disposed on a seat surface of each seat.

CITATION LIST

Patent Literatures

Patent Literature 1: JP 2013-252863 A
Patent Literature 2: JP 2005-231539 A

SUMMARY OF INVENTION

Technical Problem

All of the conventional occupant detection techniques detect an occupant on the assumption that there is one occupant in one seat. On the other hand, in a real vehicle, it is assumed that two or more occupants are present in one seat, for example, when an adult is holding a child or when a mother is breast-feeding a child. The conventional occupant detection techniques do not correspond to a state where two or more occupants are present in one seat, and therefore an occupant cannot be normally detected in such a state disadvantageously.

The present invention has been achieved in order to solve the above-described problem, and an object of the present invention is to provide an occupant detection device, an occupant detection system, and an occupant detection method corresponding to a state where two or more occupants are present in one seat.

Solution to Problem

An occupant detection device according to the invention includes: a face area detecting unit for executing a process of detecting a plurality of face areas corresponding to a plurality of faces in an image captured by a camera for capturing an image of a vehicle interior; a first determination unit for determining whether or not, among a plurality of seat areas corresponding to a plurality of seats in the captured image, there is a seat area including two or more face areas; a second determination unit for determining whether or not a duration time of a state where there is a seat area including two or more face areas has exceeded a reference time; and a warning output control unit for executing control for outputting a warning when the duration time exceeds the reference time.

Advantageous Effects of Invention

The present invention has such a configuration as described above, and therefore can obtain an occupant detection device, an occupant detection system, and an occupant detection method corresponding to a state where two or more occupants are present in one seat.

DESCRIPTION OF EMBODIMENTS

Hereinafter, in order to describe the present invention in more detail, embodiments for carrying out the present invention will be described with reference to the attached drawings.

First Embodiment

Figure 1:
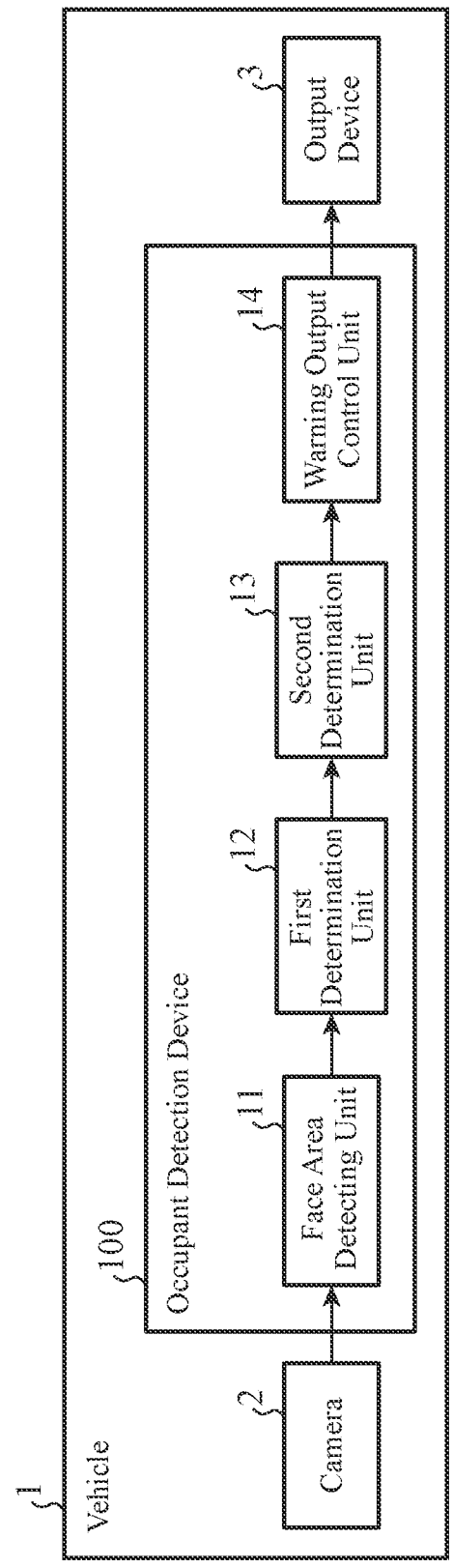
FIG. 1 is a block diagram illustrating a main part of an occupant detection device according to a first embodiment of the present invention.

FIG. 1 is a block diagram illustrating a main part of an occupant detection device according to a first embodiment. An occupant detection device 100 according to the first embodiment will be described with reference to FIG. 1.

A vehicle 1 includes a camera 2 for capturing an image of a vehicle interior. The camera 2 includes, for example, a color camera, a monochrome camera, or an infrared camera disposed in a front part of a vehicle interior of the vehicle 1. The camera 2 is disposed, for example, at the center of the vehicle 1 in the left-right direction, and captures an image in a range including a plurality of seats in the vehicle 1 from the front. Hereinafter, an image captured by the camera 2 is referred to as a "captured image".

A face area detecting unit 11 acquires image data indicating a captured image from the camera 2. The face area detecting unit 11 detects an area corresponding to a human face (hereinafter, referred to as "face area") in a captured image by executing an image recognition process on the acquired image data. This image recognition process may use facial feature points, or may use a result of machine learning. Hereinafter, the process of detecting a face area in a captured image is referred to as "face area detecting process".

Usually, a face area detected by the face area detecting process corresponds to the face of an occupant in the vehicle 1 on a one-to-one basis, and the number of face areas detected by the face area detecting process depends on the number of occupants in the vehicle 1. That is, the face area detecting process detects zero face area, one face area, or a plurality of face areas. Hereinafter, an example in which a plurality of occupants is present in the vehicle 1 and a plurality of face areas is detected by the face area detecting process, will be mainly described below.

Here, the plurality of areas corresponding to the plurality of seats in the vehicle 1 on a one-to-one basis in a captured image is referred to as "seat areas". A first determination unit 12 stores information indicating, for example, the coordinates of each of the plurality of seat areas in the captured image in advance. The first determination unit 12 acquires information indicating, for example, the coordinates of each of the plurality of face areas in the captured image from the face area detecting unit 11. The first determination unit 12 determines whether or not there is a seat area including two or more face areas using these pieces of information.

Figure 2:
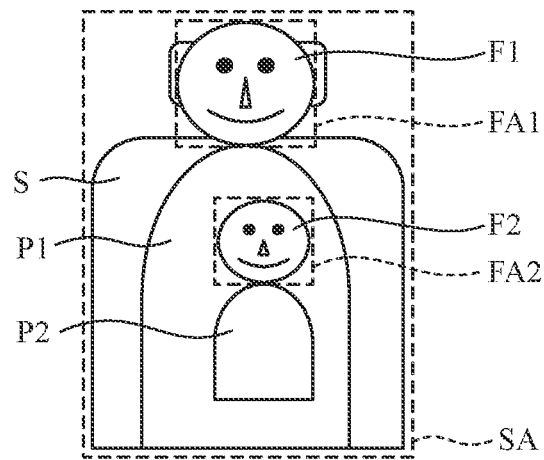
FIG. 2 is an explanatory diagram illustrating an example of a seat area including two or more face areas.

FIG. 2 illustrates an example of a seat area including two or more face areas. In the figure, S represents one seat, and SA represents one seat area corresponding to the one seat. P1 and P2 represent two occupants, F1 and F2 represent the faces of the two occupants, and FA1 and FA2 represent two face areas corresponding to the faces of the two occupants.

As illustrated in FIG. 2, two occupants P1 and P2 are present in one seat S. More specifically, one occupant P1 who is an adult is seated on the seat S, and the occupant P1 is holding the other occupant P2 who is a child. Therefore, one seat area SA includes two face areas FA1 and FA2.

When the first determination unit 12 determines that there is a seat area including two or more face areas, a second determination unit 13 counts a duration time of a state where there is a seat area including two or more face areas (hereinafter, referred to as "first duration time"). The second determination unit 13 determines whether or not the first duration time has exceeded a predetermined time (hereinafter, referred to as "first reference time", for example, 10 seconds).

When the first determination unit 12 determines that there is not a seat area including two or more face areas after the first duration time exceeds the first reference time, the second determination unit 13 counts a duration time of a state where there is not a seat area including two or more face areas (hereinafter, referred to as "second duration time"). The second determination unit 13 determines whether or not the second duration time has exceeded a predetermined time (hereinafter, referred to as "second reference time", for example, 10 seconds).

A warning output control unit 14 starts control for outputting a warning (hereinafter, referred to as "warning output control") to a driver of the vehicle 1 using an output device 3 when the second determination unit 13 determines that the first duration time has exceeded the first reference time. The warning output control unit 14 ends the warning output control when the second determination unit 13 determines that the second duration time has exceeded the second reference time.

Here, a specific example of the warning output control will be described. For example, the output device 3 is constituted by a display. The warning output control unit 14 causes the display to display an image including a message or the like prompting confirmation of presence or absence of a child not seated on a child seat (hereinafter, referred to as a "confirmation image"). Alternatively, for example, the output device 3 is constituted by a speaker. The warning output control unit 14 causes the speaker to output a voice including a message or the like prompting confirmation of presence or absence of a child not seated on a child seat (hereinafter, referred to as "confirmation voice").

The face area detecting unit 11, the first determination unit 12, the second determination unit 13, and the warning output control unit 14 constitute a main part of the occupant detection device 100.

Next, a hardware configuration of a main part of the occupant detection device 100 will be described with reference to FIG. 3.

Figure 3A:
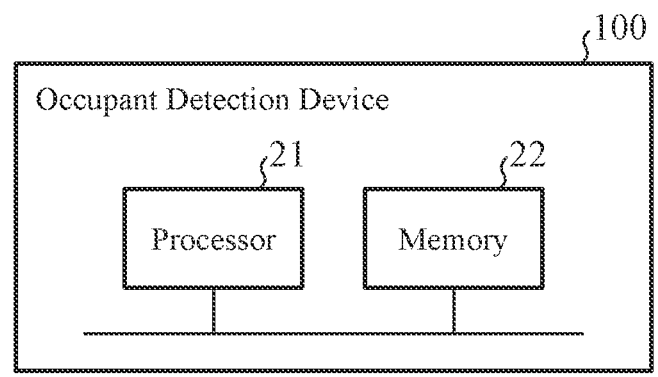
FIG. 3A is a block diagram illustrating a hardware configuration of the occupant detection device according to the first embodiment of the present invention.

As illustrated in FIG. 3A, the occupant detection device 100 is constituted by a computer, and the computer includes a processor 21 and a memory 22. The memory 22 stores a program for causing the computer to function as the face area detecting unit 11, the first determination unit 12, the second determination unit 13, and the warning output control unit 14. The processor 21 reads and executes the program stored in the memory 22, and the functions of the face area detecting unit 11, the first determination unit 12, the second determination unit 13, and the warning output control unit 14 are thereby implemented.

Furthermore, the memory 22 stores various types of data (for example, image data indicating a captured image) used for processes of the face area detecting unit 11, the first determination unit 12, the second determination unit 13, and the warning output control unit 14. Note that the image data indicating a captured image may be divided into individual seat areas and stored in the memory 22. Alternatively, the image data indicating a captured image may be divided into a seat area corresponding to a front seat and a seat area corresponding to a rear seat and stored in the memory 22.

The processor 21 uses, for example, a central processing unit (CPU), a graphics processing unit (GPU), a microprocessor, a microcontroller, or a digital signal processor (DSP). The memory 22 uses, for example, a semiconductor memory such as a random access memory (RAM), a read only memory (ROM), a flash memory, an erasable programmable read only memory (EPROM), or an electrically erasable programmable read-only memory (EEPROM), a magnetic disk, an optical disk, or a magneto-optical disk.

Figure 3B:
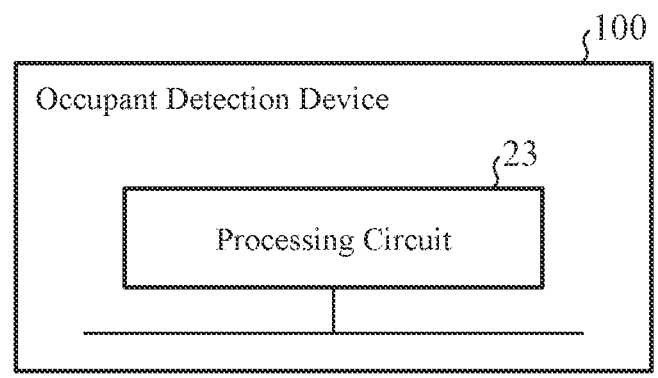
FIG. 3B is a block diagram illustrating another hardware configuration of the occupant detection device according to the first embodiment of the present invention.

Alternatively, as illustrated in FIG. 3B, the functions of the face area detecting unit 11, the first determination unit 12, the second determination unit 13, and the warning output control unit 14 may be implemented by a dedicated processing circuit 23. The processing circuit 23 uses, for example, an application specific integrated circuit (ASIC), a programmable logic device (PLD), a field-programmable gate array (FPGA), a system-on-a-chip (SoC), or a system large-scale integration (LSI).

Alternatively, some of the functions of the face area detecting unit 11, the first determination unit 12, the second determination unit 13, and the warning output control unit 14 may be implemented by the processor 21 and the memory 22, and the remaining functions may be implemented by the processing circuit 23.

Figure 4A:
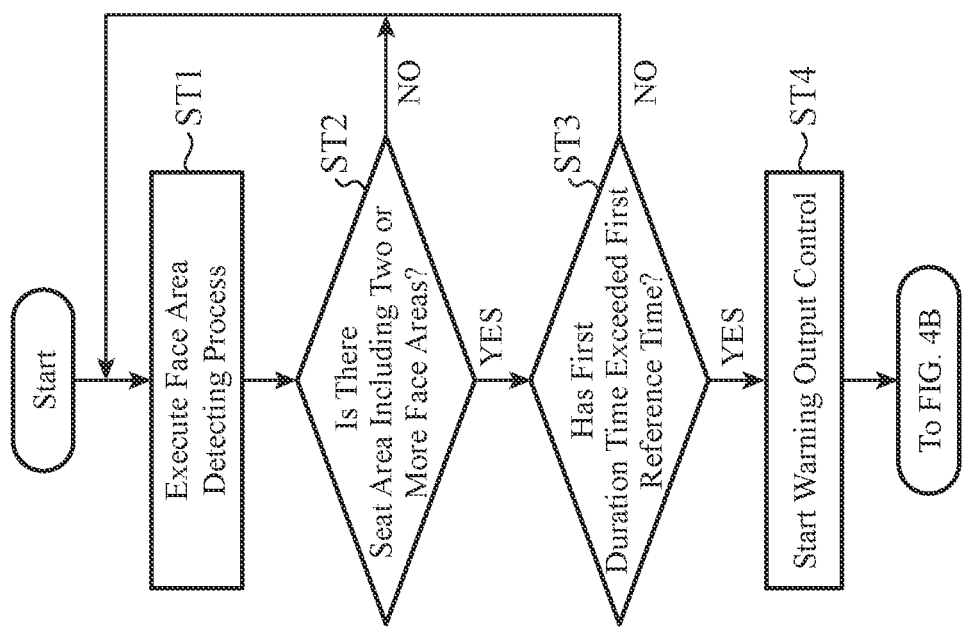
FIG. 4A is a flowchart illustrating an operation of the occupant detection device according to the first embodiment of the present invention.
Figure 4B:
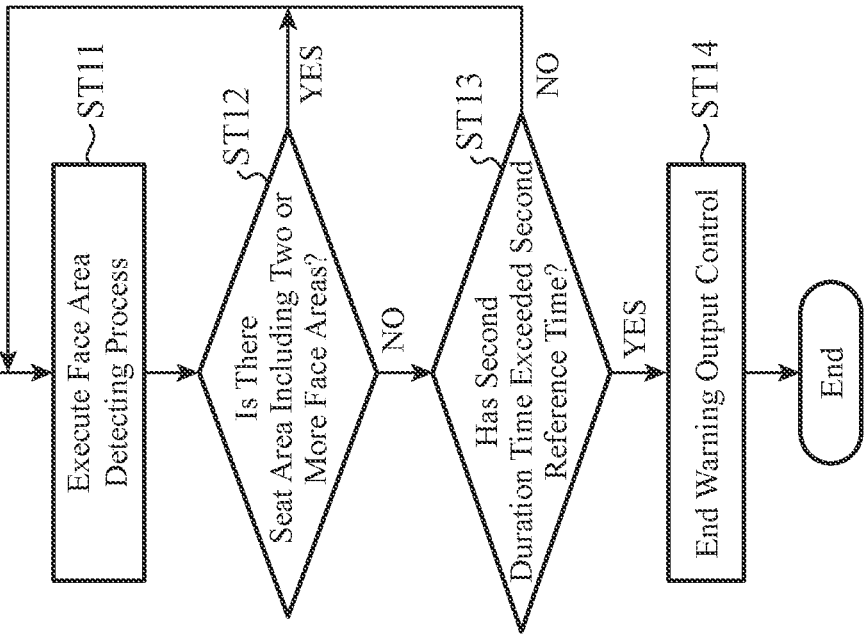
FIG. 4B is a flowchart illustrating another operation of the occupant detection device according to the first embodiment of the present invention.

Next, an operation of the occupant detection device 100 will be described with reference to the flowchart of FIG. 4.

First, in step ST1, the face area detecting unit 11 acquires image data indicating a captured image from the camera 2, and executes a face area detecting process. The face area detecting unit 11 outputs information indicating, for example, the coordinates of each of the plurality of face areas detected by the face area detecting process to the first determination unit 12.

Next, in step ST2, the first determination unit 12 determines whether or not there is a seat area including two or more face areas using, for example, the information output by the face area detecting unit 11 in step ST1. If it is determined that there is not a seat area including two or more face areas ("NO" in step ST2), the process of the occupant detection device 100 returns to step ST1. Meanwhile, if it is determined that there is a seat area including two or more face areas ("YES" in step ST2), the process of the occupant detection device 100 proceeds to step ST3.

Next, in step ST3, the second determination unit 13 determines whether or not a duration time of a state where there is a seat area including two or more face areas has exceeded a predetermined time, that is, whether or not the first duration time has exceeded the first reference time. The first duration time is counted by the second determination unit 13. If the first duration time is within the first reference time ("NO" in step ST3), the process of the occupant detection device 100 returns to step ST1. Meanwhile, if the first duration time has exceeded the first reference time ("YES" in step ST3), the process of the occupant detection device 100 proceeds to step ST4.

Next, in step ST4, the warning output control unit 14 starts warning output control. Specifically, for example, the warning output control unit 14 causes a display to display a confirmation image, or causes a speaker to output a confirmation voice.

Next, in step ST11, the face area detecting unit 11 acquires image data indicating a captured image from the camera 2, and executes a face area detecting process. The face area detecting unit 11 outputs information indicating, for example, the coordinates of each of the plurality of face areas detected by the face area detecting process to the first determination unit 12.

Next, in step ST12, the first determination unit 12 determines whether or not there is a seat area including two or more face areas using, for example, the information output by the face area detecting unit 11 in step ST11. If it is determined that there is a seat area including two or more face areas ("YES" in step ST12), the process of the occupant detection device 100 returns to step ST11. Meanwhile, if it is determined that there is not a seat area including two or more face areas ("NO" in step ST12), the process of the occupant detection device 100 proceeds to step ST13.

Next, in step ST13, the second determination unit 13 determines whether or not a duration time of a state where there is not a seat area including two or more face areas has exceeded a predetermined time, that is, whether or not the second duration time has exceeded the second reference time. The second duration time is counted by the second determination unit 13. If the second duration time is within the second reference time ("NO" in step ST13), the process of the occupant detection device 100 returns to step ST11. Meanwhile, if the second duration time has exceeded the second reference time ("YES" in step ST13), the process of the occupant detection device 100 proceeds to step ST14.

Next, in step ST14, the warning output control unit 14 ends the warning output control.

Note that if the state where there is a seat area including two or more face areas is eliminated before the first duration time exceeds the first reference time (that is, if "NO" is determined in step ST2 after "NO" is determined in step ST3), the warning output control unit 14 may notify a driver of the vehicle 1 of the fact. Specifically, for example, the warning output control unit 14 may cause a display to display an image including a message or the like indicating that a state where there may be a child not seated on a child seat has been eliminated, or may cause a speaker to output a voice including the message or the like.

Furthermore, an operation input device (not illustrated) may be disposed in the vehicle 1, and an operation for responding to a confirmation image or a confirmation voice (hereinafter, referred to as "response operation") may be input thereto. In a case where the response operation indicates that there is a child not seated on a child seat, when the vehicle 1 is traveling, the warning output control unit 14 may cause a display to display an image including a message or the like prompting deceleration or stop of the vehicle 1, or may cause a speaker to output a voice including the message or the like, as a part of the warning output control. In a case where the response operation indicates that there is a child not seated on a child seat, when the vehicle 1 is parked or stopped, the warning output control unit 14 may cause a display to display an image including a message or the like suppressing start of the vehicle 1, or may cause a speaker to output a voice including the message or the like, as a part of the warning output control. The operation input device is constituted by, for example, a touch panel, a hardware key, a remote controller, a gesture input device, or a voice recognition device.

An airbag (not illustrated) for each seat may be disposed in the vehicle 1, and the occupant detection device 100 may include an airbag control unit (not illustrated) for controlling the airbag. When the response operation indicates that there is a child not seated on a child seat, the airbag control unit sets an airbag for a seat corresponding to a seat area including two or more face areas to an operation stop state. Thereafter, if the second determination unit 13 determines that the second duration time has exceeded the second reference time ("YES" in step ST13), the airbag control unit releases the operation stop state of the airbag for the seat.

The camera 2 for capturing an image of a vehicle interior may be constituted by a plurality of cameras. For example, at least one camera may be disposed in a front part corresponding to each of a plurality of seats in the vehicle 1, and these cameras may constitute the camera 2 for capturing an image of a vehicle interior.

Figure 5:
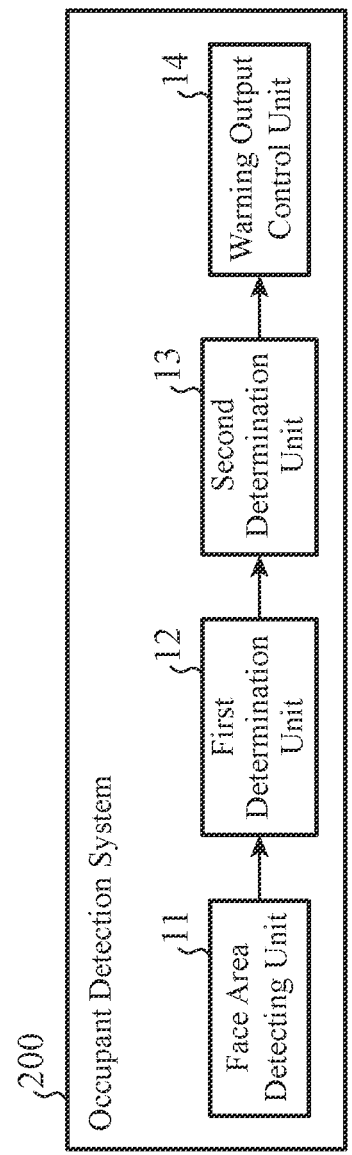
FIG. 5 is a block diagram illustrating a main part of an occupant detection system according to the first embodiment of the present invention.
Figure 6A:
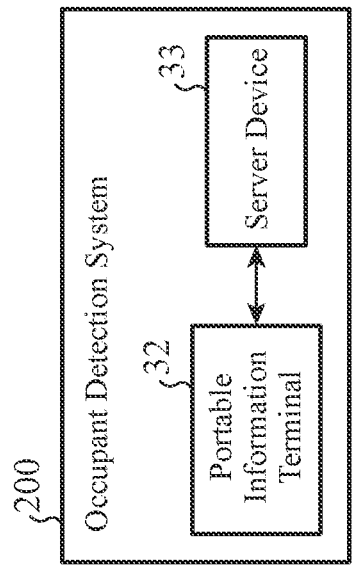
FIG. 6A is a block diagram illustrating a system configuration of the occupant detection system according to the first embodiment of the present invention.
Figure 6B:
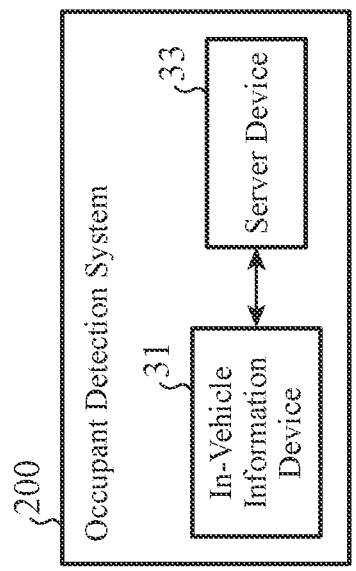
FIG. 6B is a block diagram illustrating another system configuration of the occupant detection system according to the first embodiment of the present invention.
Figure 6C:
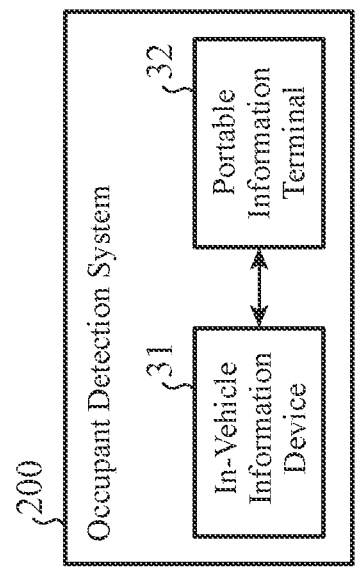
FIG. 6C is a block diagram illustrating another system configuration of the occupant detection system according to the first embodiment of the present invention.
Figure 6D:
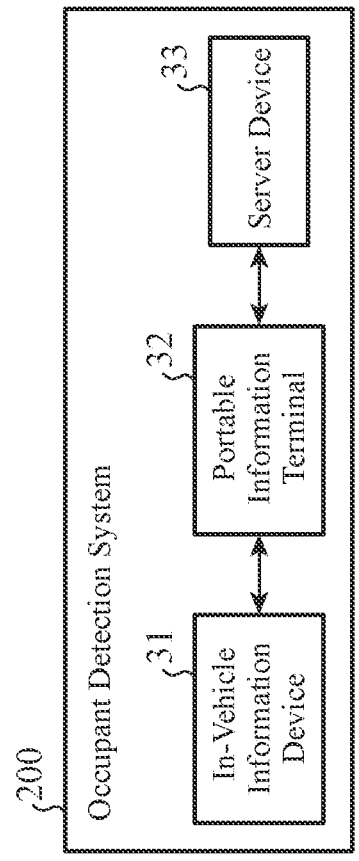
FIG. 6D is a block diagram illustrating another system configuration of the occupant detection system according to the first embodiment of the present invention.

As illustrated in FIG. 5, the face area detecting unit 11, the first determination unit 12, the second determination unit 13, and the warning output control unit 14 may constitute a main part of an occupant detection system 200. In this case, each of the face area detecting unit 11, the first determination unit 12, the second determination unit 13, and the warning output control unit 14 only needs to be disposed in any one of an in-vehicle information device 31 that can be mounted on the vehicle 1, a portable information terminal 32 that can be brought into the vehicle 1, such as a smartphone, and a server device 33 that can communicate with the in-vehicle information device 31 or the portable information terminal 32.

Each of FIGS. 6A to 6D illustrates a system configuration of a main part of the occupant detection system 200. As illustrated in FIGS. 6A to 6D, it is only required to implement the function of the occupant detection system 200 by cooperation of any two or more of the in-vehicle information device 31, the portable information terminal 32, and the server device 33.

As described above, the occupant detection device 100 according to the first embodiment includes: the face area detecting unit 11 for executing a process (face area detecting process) of detecting a plurality of face areas corresponding to a plurality of faces in an image captured by the camera 2 for capturing an image of a vehicle interior; the first determination unit 12 for determining whether or not, among a plurality of seat areas corresponding to a plurality of seats in the captured image, there is a seat area including two or more face areas; the second determination unit 13 for determining whether or not a duration time (first duration time) of a state where there is a seat area including two or more face areas has exceeded a reference time (first reference time); and the warning output control unit 14 for executing control for outputting a warning (warning output control) when the duration time (first duration time) exceeds the reference time (first reference time). As a result, it is possible to implement the occupant detection device 100 corresponding to a state where two or more occupants are present in one seat. In addition, it is possible to prompt a driver of the vehicle 1 to confirm presence or absence of a child not seated on a child seat.

The occupant detection system 200 according to the first embodiment includes: the face area detecting unit 11 for executing a process (face area detecting process) of detecting a plurality of face areas corresponding to a plurality of faces in an image captured by the camera 2 for capturing an image of a vehicle interior; the first determination unit 12 for determining whether or not, among a plurality of seat areas corresponding to a plurality of seats in the captured image, there is a seat area including two or more face areas; the second determination unit 13 for determining whether or not a duration time (first duration time) of a state where there is a seat area including two or more face areas has exceeded a reference time (first reference time); and the warning output control unit 14 for executing control for outputting a warning (warning output control) when the duration time (first duration time) exceeds the reference time (first reference time). As a result, it is possible to implement the occupant detection system 200 corresponding to a state where two or more occupants are present in one seat. In addition, it is possible to prompt a driver of the vehicle 1 to confirm presence or absence of a child not seated on a child seat.

An occupant detection method according to the first embodiment includes: step ST1 in which the face area detecting unit 11 executes a process (face area detecting process) of detecting a plurality of face areas corresponding to a plurality of faces in an image captured by the camera 2 for capturing an image of a vehicle interior; step ST2 in which the first determination unit 12 determines whether or not, among a plurality of seat areas corresponding to a plurality of seats in the captured image, there is a seat area including two or more face areas; step ST3 in which the second determination unit 13 determines whether or not a duration time (first duration time) of a state where there is a seat area including two or more face areas has exceeded a reference time (first reference time); and step ST4 in which the warning output control unit 14 executes control for outputting a warning (warning output control) when the duration time (first duration time) exceeds the reference time (first reference time). As a result, it is possible to implement an occupant detection method corresponding to a state where two or more occupants are present in one seat. In addition, it is possible to prompt a driver of the vehicle 1 to confirm presence or absence of a child not seated on a child seat.

Second Embodiment

Figure 7:
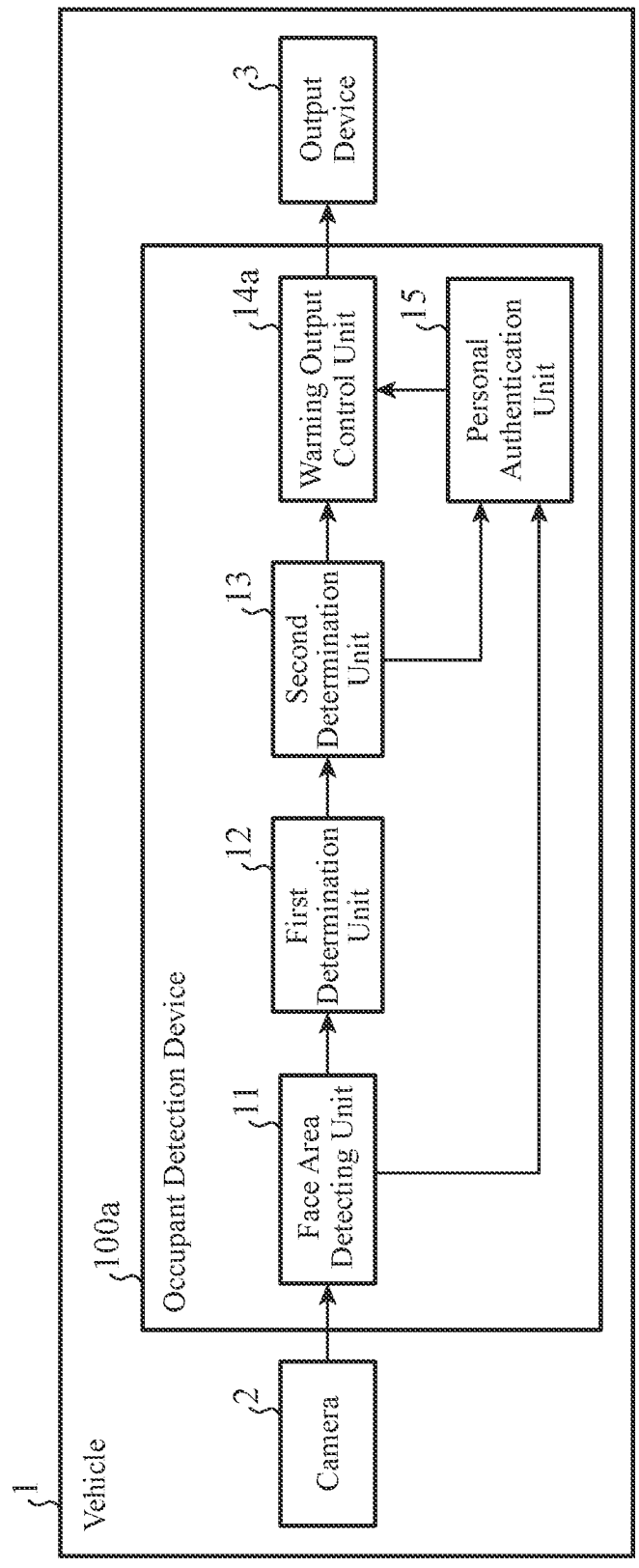
FIG. 7 is a block diagram illustrating a main part of an occupant detection device according to a second embodiment of the present invention.

FIG. 7 is a block diagram illustrating a main part of an occupant detection device according to a second embodiment. An occupant detection device 100a according to the second embodiment will be described with reference to FIG. 7. Note that in FIG. 7, the same reference numerals are given to blocks similar to those illustrated in FIG. 1, and description thereof will be omitted.

In a case where a first determination unit 12 determines that there is a seat area including two or more face areas, when a second determination unit 13 determines that a first duration time has exceeded a first reference time, a personal authentication unit 15 executes a personal authentication process for each of two or more faces corresponding to the two or more face areas on a one-to-one basis. Hereinafter, in the second embodiment, the two or more face areas in a seat area including the two or more face areas are referred to as "authentication target face areas", and two or more occupants in a seat corresponding to the seat area are referred to as "authentication target occupants".

The personal authentication process by the personal authentication unit 15 is performed by so-called "face authentication". The personal authentication unit 15 stores a database for face authentication in advance. This database includes personal information of a plurality of persons (for example, information indicating the name of an owner of the vehicle 1, the name of a family member of the owner of the vehicle 1, and a blood relationship between these persons), and information indicating a feature amount for face authentication in the plurality of persons so as to correspond to each other.

When a plurality of face areas is detected by the face area detecting process, a face area detecting unit 11 extracts a feature amount for face authentication in each of the plurality of face areas. The personal authentication unit 15 acquires information indicating a feature amount for face authentication in each authentication target face area from the face area detecting unit 11. The personal authentication unit 15 determines whether or not personal information of each authentication target occupant is included in the database by comparing the feature amount indicated by the acquired information with the feature amount in the database.

When the personal information of each authentication target occupant is included in the database, the personal authentication unit 15 outputs the personal information of each authentication target occupant to a warning output control unit 14*a*. Meanwhile, when the personal information of each authentication target occupant is not included in the database, the personal authentication unit 15 outputs information indicating this fact to the warning output control unit 14*a*. That is, the personal authentication unit 15 outputs a result of the personal authentication process to the warning output control unit 14*a*.

The warning output control unit 14*a* executes control for outputting a warning having content depending on the result of the personal authentication process by the personal authentication unit 15, that is, warning output control. More specifically, when the personal authentication unit 15 outputs personal information of each authentication target occupant, the warning output control unit 14*a* executes control for outputting a warning having content based on the personal information.

For example, in a state similar to that described with reference to FIG. 2 in the first embodiment, it is assumed that occupant P1 is a mother and occupant P2 is a child of the mother. In the occupant detection device 100 according to the first embodiment, a blood relationship between occupants P1 and P2, the names of occupants P1 and P2, and the like are unknown. For this reason, the warning output control unit 14 includes, in a confirmation image or a confirmation voice, a message or the like prompting confirmation of presence or absence of a child not seated on a child seat.

On the other hand, in the occupant detection device 100*a* according to the second embodiment, when the personal authentication process by the personal authentication unit 15 is successful, the result of the personal authentication process by the personal authentication unit 15 indicates a blood relationship between occupants P1 and P2 and the names of the occupants P1 and P2. Therefore, the warning output control unit 14*a* includes, for example, a message or the like prompting confirmation of whether a mother is holding a child in a confirmation image or a confirmation voice.

Note that when the result of the personal authentication process by the personal authentication unit 15 does not include personal information of each authentication target occupant, the warning output control unit 14*a* may include a message or the like prompting confirmation of presence or absence of a child not seated on a child seat in a confirmation image or a confirmation voice as in the occupant detection device 100 according to the first embodiment.

The face area detecting unit 11, the first determination unit 12, the second determination unit 13, the warning output control unit 14*a*, and the personal authentication unit 15 constitute a main part of the occupant detection device 100*a*.

Since the hardware configuration of the main part of the occupant detection device 100*a* is similar to that described with reference to FIG. 3 in the first embodiment, illustration thereof and description thereof will be omitted. That is, the function of the personal authentication unit 15 may be implemented by a processor 21 and a memory 22, or may be implemented by a processing circuit 23.

Figure 8A:
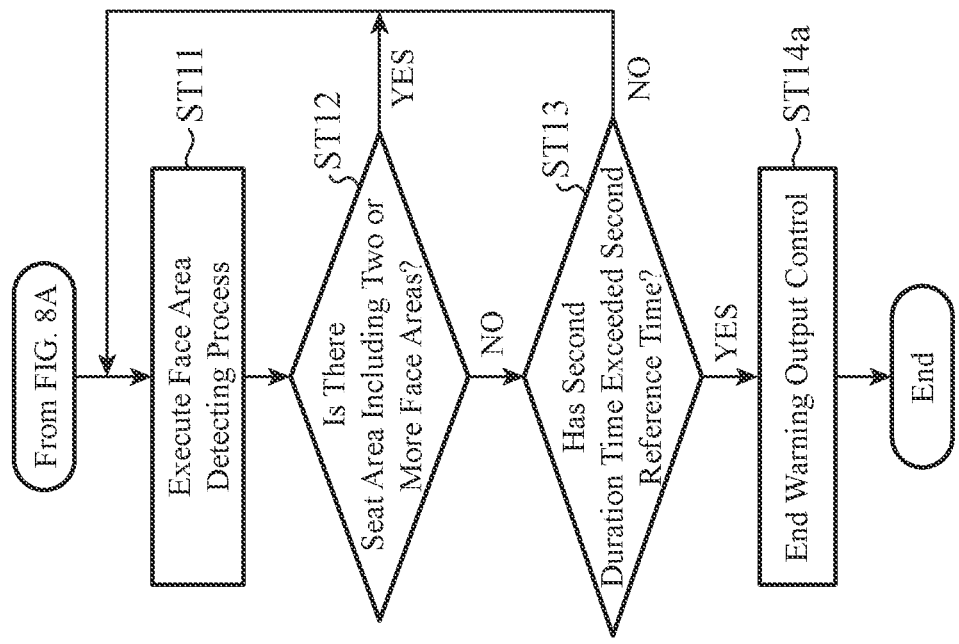
FIG. 8A is a flowchart illustrating an operation of the occupant detection device according to the second embodiment of the present invention.
Figure 8B:
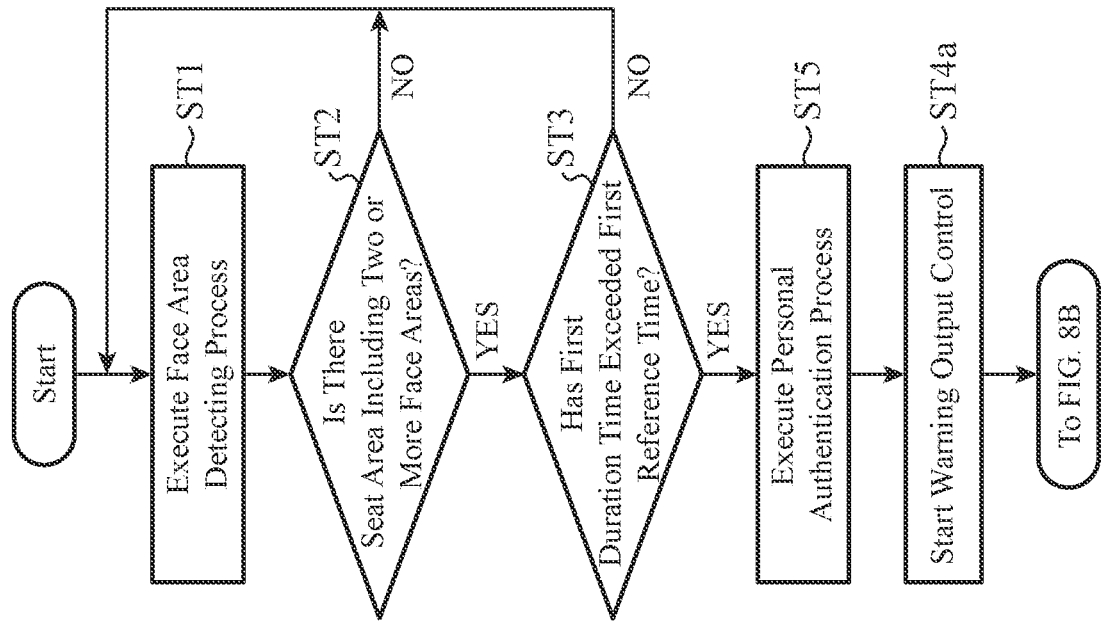
FIG. 8B is a flowchart illustrating another operation of the occupant detection device according to the second embodiment of the present invention.

Next, an operation of the occupant detection device 100*a* will be described with reference to the flowchart of FIG. 8. Note that in FIG. 8, the same reference numerals are given to steps similar to those illustrated in FIG. 4, and description thereof will be omitted.

In a case where the first determination unit 12 determines that there is a seat area including two or more face areas ("YES" in step ST2), if the second determination unit 13 determines that the first duration time has exceeded the first reference time ("YES" in step ST3), the personal authentication unit 15 executes a personal authentication process (step ST5). Since a specific example of the personal authentication process has been described above, the description thereof will not be repeated.

Next, in step ST4*a*, the warning output control unit 14*a* starts control for outputting a warning having content depending on the result of the personal authentication process in step ST5, that is, warning output control. Since a specific example of the warning output control by the warning output control unit 14*a* has been described above, the description thereof will not be repeated. Thereafter, in step ST14*a*, the warning output control unit 14*a* ends the warning output control.

Note that the warning output control unit 14*a* only needs to execute control for outputting a warning having content depending on the result of the personal authentication process by the personal authentication unit 15. The content of the message included in the confirmation image or the confirmation voice are not limited to the above specific example.

In addition, the occupant detection device 100*a* can adopt various modifications similar to those described in the first embodiment.

Figure 9:
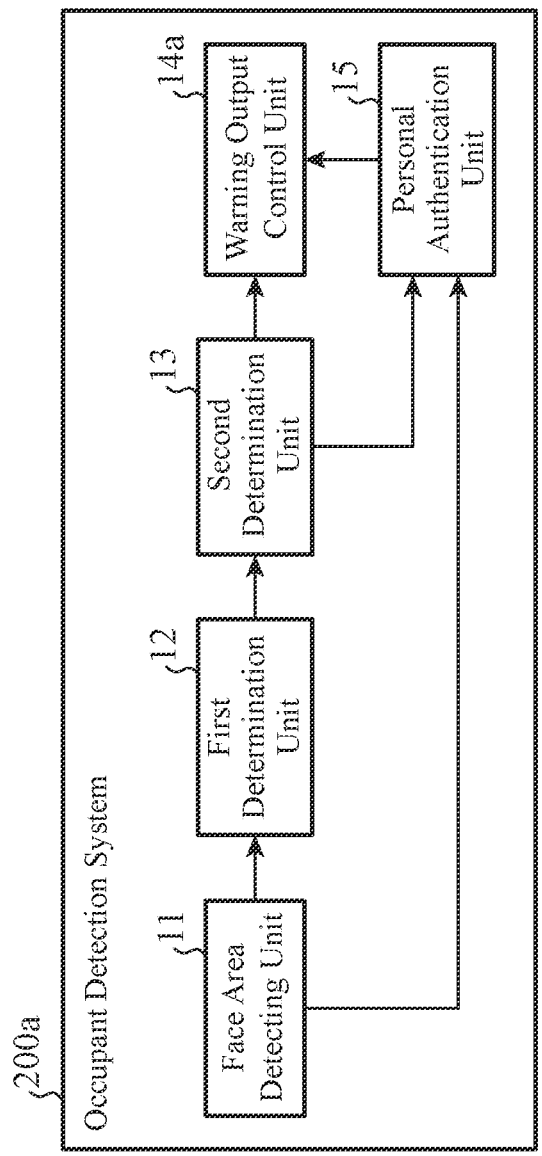
FIG. 9 is a block diagram illustrating a main part of an occupant detection system according to the second embodiment of the present invention.

As illustrated in FIG. 9, the face area detecting unit 11, the first determination unit 12, the second determination unit 13, the warning output control unit 14*a*, and the personal authentication unit 15 may constitute a main part of an occupant detection system 200*a*.

Since the system configuration of the main part of the occupant detection system 200*a* is similar to that described with reference to FIG. 6 in the first embodiment, illustration thereof and description thereof will be omitted. That is, it is only required to implement the function of the occupant detection system 200*a* by cooperation of any two or more of an in-vehicle information device 31, a portable information terminal 32, and a server device 33.

As described above, the occupant detection device 100*a* according to the second embodiment includes the personal authentication unit 15 for executing a personal authentication process on each of two or more faces corresponding to two or more face areas, and the warning output control unit 14*a* executes control for outputting a warning having content depending on the result of the personal authentication process. By using the result of the personal authentication process, it is possible to output a warning including a message having more specific content depending on, for example, the situation of a seat in which two or more occupants are present.

Third Embodiment

Figure 10:
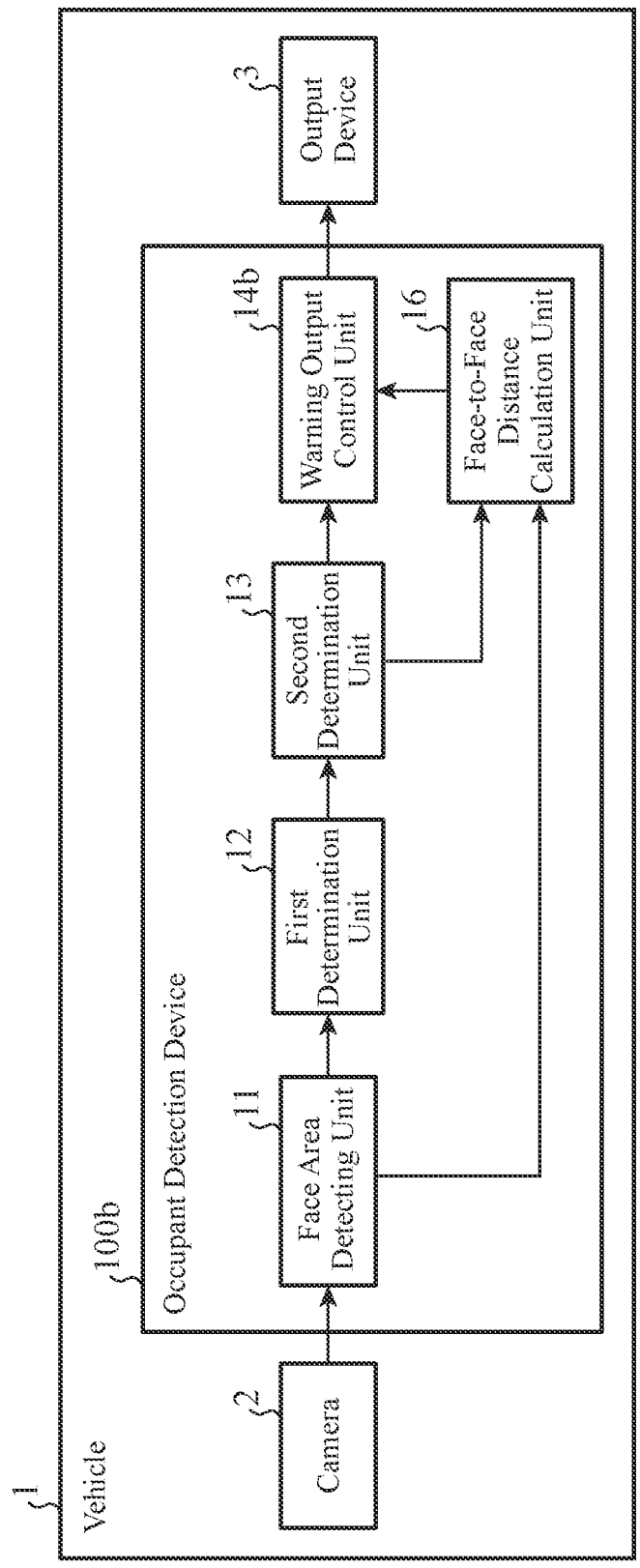
FIG. 10 is a block diagram illustrating a main part of an occupant detection device according to a third embodiment of the present invention.

FIG. 10 is a block diagram illustrating a main part of an occupant detection device according to a third embodiment. An occupant detection device 100b according to the third embodiment will be described with reference to FIG. 10. Note that in FIG. 10, the same reference numerals are given to blocks similar to those illustrated in FIG. 1, and description thereof will be omitted.

In a case where a first determination unit 12 determines that there is a seat area including two or more face areas, when a second determination unit 13 determines that a first duration time has exceeded a first reference time, a face-to-face distance calculation unit 16 calculates a distance between every two faces (hereinafter, referred to as "face-to-face distance") among two or more faces corresponding to the two or more face areas on a one-to-one basis.

Specifically, for example, the face-to-face distance calculation unit 16 acquires information indicating, for example, the coordinates of each of the two or more face areas in a captured image from a face area detecting unit 11. The face-to-face distance calculation unit 16 calculates a distance between the centers of every two face areas among the two or more face areas (hereinafter, referred to as "face area-to-face area distance") using the acquired information. Usually, the face area-to-face area distance is represented by a pixel value. The face-to-face distance calculation unit 16 calculates a face-to-face distance by converting a face area-to-face area distance from a pixel value into a meter value. That is, the face-to-face distance is a distance in a real space, and the face-to-face distance is a distance in a direction along an imaging surface of a captured image.

A warning output control unit 14b executes control for outputting a warning having content depending on a face-to-face distance calculated by the face area detecting unit 11, that is, warning output control.

Specifically, for example, the warning output control unit 14b compares a face-to-face distance with a predetermined distance (hereinafter, referred to as a "reference distance"). When the face-to-face distance is equal to or less than the reference distance, for example, the warning output control unit 14b causes a display to display a confirmation image including a message or the like prompting confirmation of presence or absence of a child held by an adult, or causes a speaker to output a confirmation voice including the message or the like. Alternatively, for example, the warning output control unit 14b causes a display to display a confirmation image including a message or the like prompting confirmation of presence or absence of a child being breast-fed, or causes a speaker to output a confirmation voice including the message or the like.

Meanwhile, when the face-to-face distance is larger than the reference distance, the warning output control unit 14b causes a display to display a confirmation image including a message or the like prompting confirmation of presence or absence of a child not seated on a child seat, or causes a speaker to output a confirmation voice including the message or the like as in the occupant detection device 100 according to the first embodiment.

That is, as a specific example of a state where two or more occupants are present in one seat, for example, a state where an adult is holding a child (hereinafter, referred to as "first state"), a state where a mother or the like is breast-feeding a child (hereinafter, referred to as "second state"), or a state where a child is present between the knees of a seated adult (hereinafter, referred to as "third state") is assumed. The reference distance is set to a value that makes it possible to distinguish the first state and the second state from another state (for example, the third state) on the basis of an average physique of an adult or the like. As a result, when the face-to-face distance is equal to or less than the reference distance, a message having more specific content can be included in a warning image or a warning voice.

The face area detecting unit 11, the first determination unit 12, the second determination unit 13, the warning output control unit 14b, and the face-to-face distance calculation unit 16 constitute a main part of the occupant detection device 100b.

Since the hardware configuration of the main part of the occupant detection device 100b is similar to that described with reference to FIG. 3 in the first embodiment, illustration thereof and description thereof will be omitted. That is, the function of the face-to-face distance calculation unit 16 may be implemented by a processor 21 and a memory 22, or may be implemented by a processing circuit 23.

Figure 11B:
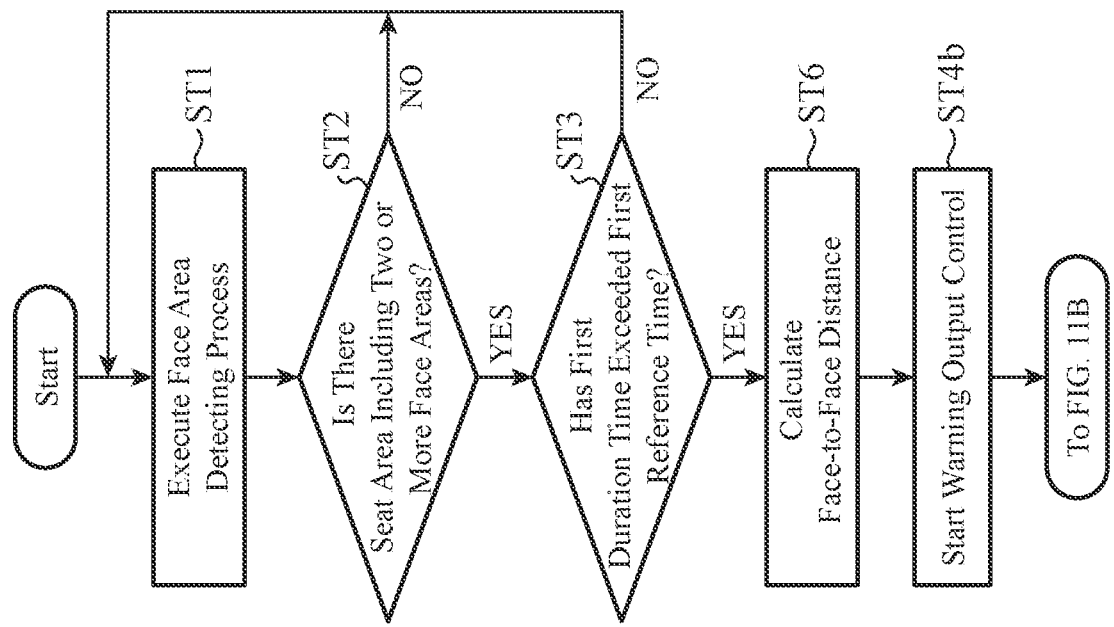
FIG. 11B is a flowchart illustrating another operation of the occupant detection device according to the third embodiment of the present invention.
Figure 11A:
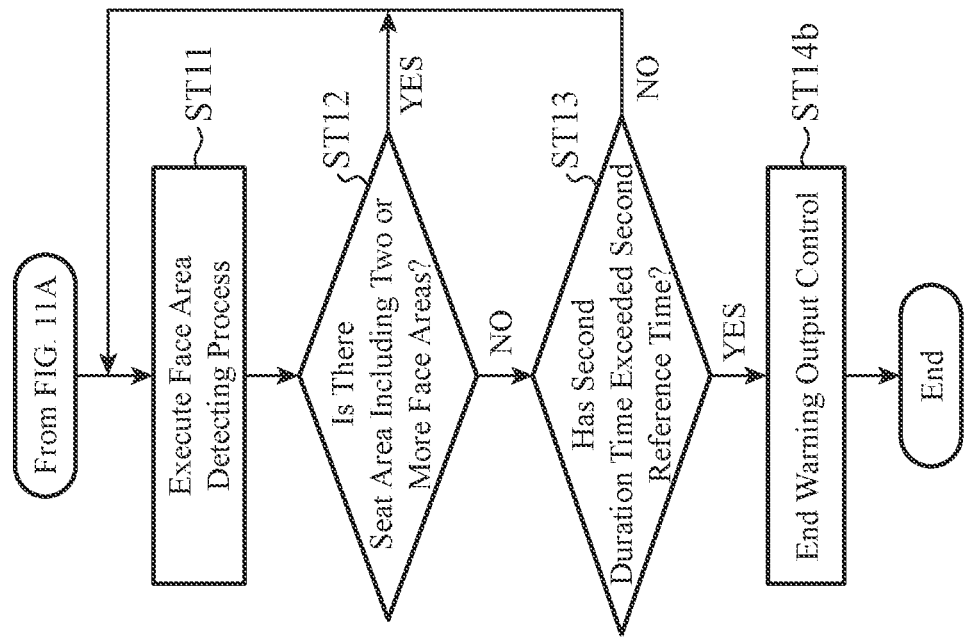
FIG. 11A is a flowchart illustrating an operation of the occupant detection device according to the third embodiment of the present invention.

Next, an operation of the occupant detection device 100b will be described with reference to the flowchart of FIG. 11. Note that in FIG. 11, the same reference numerals are given to steps similar to those illustrated in FIG. 4, and description thereof will be omitted.

In a case where the first determination unit 12 determines that there is a seat area including two or more face areas ("YES" in step ST2), if the second determination unit 13 determines that the first duration time has exceeded the first reference time ("YES" in step ST3), the face-to-face distance calculation unit 16 calculates a face-to-face distance (step ST6). Since a specific example of a method for calculating a face-to-face distance has been described above, the description thereof will not be repeated.

Next, in step ST4b, the warning output control unit 14b starts control for outputting a warning having content depending on a face-to-face distance calculated in step ST6, that is, warning output control. Since a specific example of the warning output control by the warning output control unit 14b has been described above, the description thereof will not be repeated. Thereafter, in step ST14b, the warning output control unit 14b ends the warning output control.

Note that the face-to-face distance calculation unit 16 may calculate a longitudinal face area-to-face area distance in a captured image and a lateral face area-to-face area distance in the captured image. The face-to-face distance calculation unit 16 may calculate a vertical face-to-face distance in a real space by converting a longitudinal face area-to-face area distance from a pixel value into a meter value. The face-to-face distance calculation unit 16 may calculate a horizontal face-to-face distance in a real space by converting a lateral face area-to-face area distance from a pixel value into a meter value.

In this case, the warning output control unit 14b may compare a vertical face-to-face distance with a predetermined distance (hereinafter, referred to as "first reference distance") and execute warning output control similar to that described above. When the warning output control unit 14b compares a horizontal face-to-face distance with a predetermined distance (hereinafter, referred to as "second reference distance") and the horizontal face-to-face distance is larger than the second reference distance, the warning output control unit 14b may cancel execution of the warning output control. This is because, when the horizontal face-to-face distance is larger than the second reference distance, for example, the face of an occupant in a rear seat may be reflected in a seat area corresponding to a front seat.

In addition, the warning output control unit 14b only needs to execute control for outputting a warning having content depending on a face-to-face distance calculated by the face area detecting unit 11. The content of the message included in the confirmation image or the confirmation voice are not limited to the above specific example.

The occupant detection device 100b may include a personal authentication unit 15 as in the occupant detection device 100a according to the second embodiment. In this case, the warning output control unit 14b may execute control for outputting a warning having content depending on a result of a personal authentication process by the personal authentication unit 15 and a face-to-face distance calculated by the face area detecting unit 11.

In addition, the occupant detection device 100b can adopt various modifications similar to those described in the first embodiment.

Figure 12:
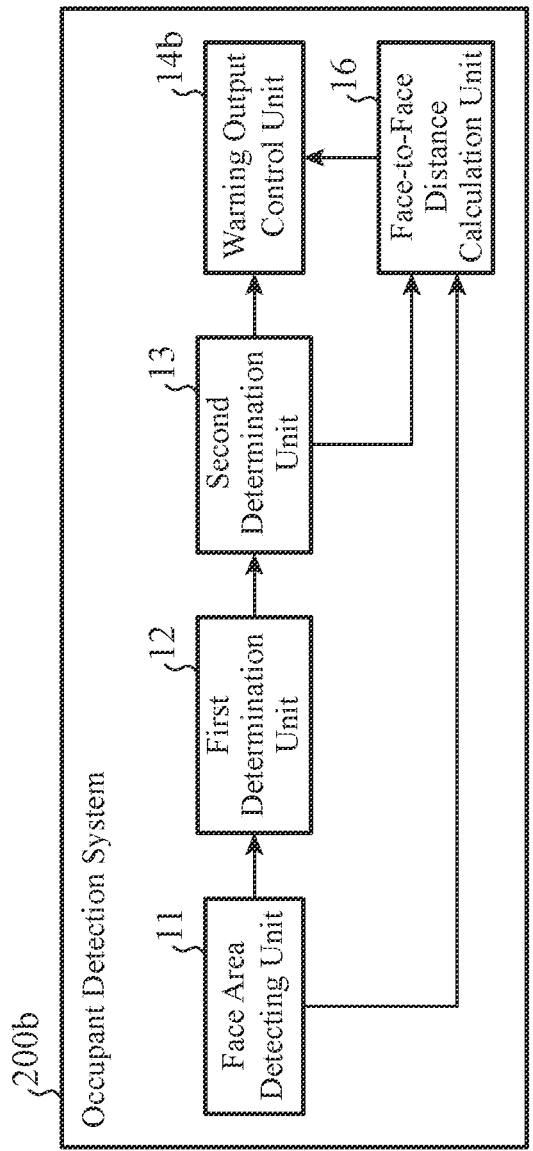
FIG. 12 is a block diagram illustrating a main part of an occupant detection system according to the third embodiment of the present invention.

As illustrated in FIG. 12, the face area detecting unit 11, the first determination unit 12, the second determination unit 13, the warning output control unit 14b, and the face-to-face distance calculation unit 16 may constitute a main part of an occupant detection system 200b.

Since the system configuration of the main part of the occupant detection system 200b is similar to that described with reference to FIG. 6 in the first embodiment, illustration thereof and description thereof will be omitted. That is, it is only required to implement the function of the occupant detection system 200b by cooperation of any two or more of an in-vehicle information device 31, a portable information terminal 32, and a server device 33.

As described above, the occupant detection device 100b according to the third embodiment includes the face-to-face distance calculation unit 16 for calculating a distance between two or more faces (face-to-face distance) corresponding to two or more face areas, and the warning output control unit 14b executes control (warning output control) for outputting a warning having content depending on a distance (face-to-face distance) calculated by the face-to-face distance calculation unit 16. As a result, when there is a high probability that an adult is holding a child, a mother or the like is breast-feeding a child, or the like, a warning including a message having more specific content can be output.

Fourth Embodiment

Figure 13:
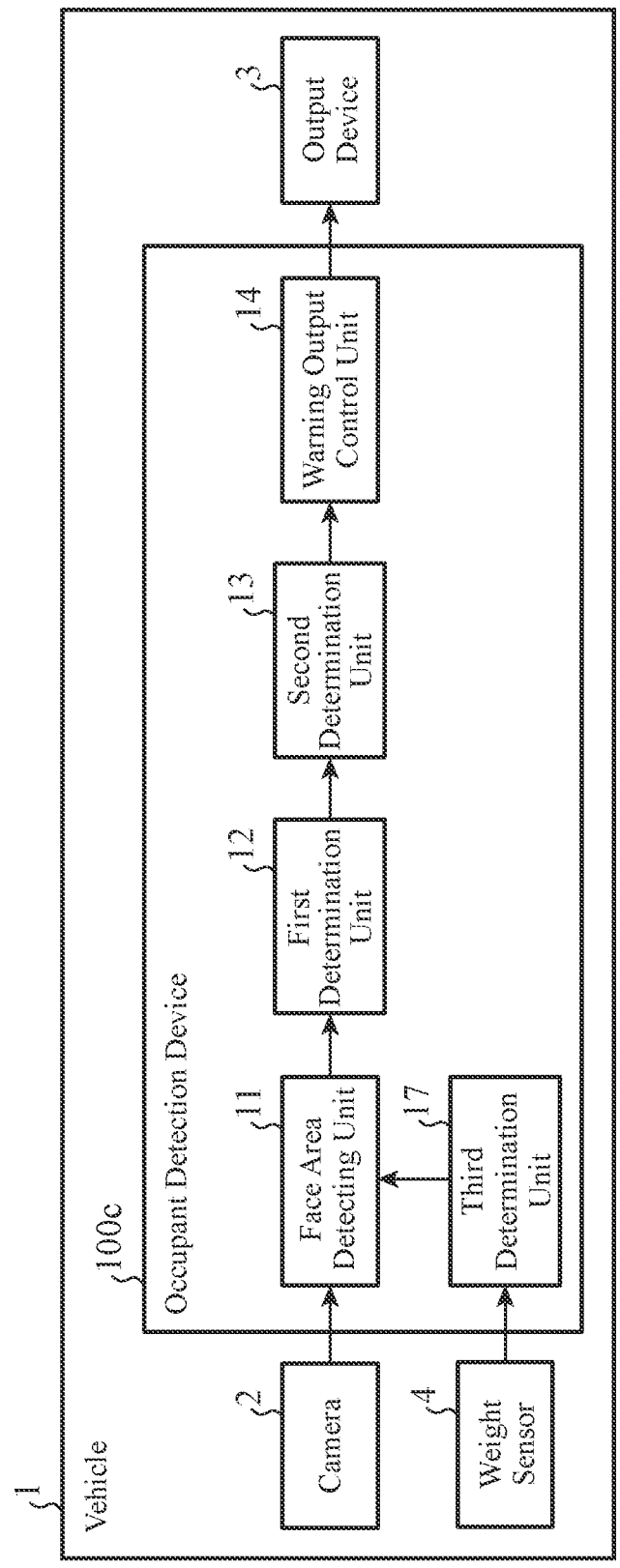
FIG. 13 is a block diagram illustrating a main part of an occupant detection device according to a fourth embodiment of the present invention.

FIG. 13 is a block diagram illustrating a main part of an occupant detection device according to a fourth embodiment. An occupant detection device 100c according to the fourth embodiment will be described with reference to FIG. 13. Note that in FIG. 13, the same reference numerals are given to blocks similar to those illustrated in FIG. 1, and description thereof will be omitted.

A weight sensor 4 is disposed on a seat surface of each seat in a vehicle 1. A third determination unit 17 acquires a value detected by the weight sensor 4 at predetermined time intervals. The third determination unit 17 determines whether or not there is a change in the weight of each seat in the vehicle 1 using the acquired detection value. A face area detecting unit 11 executes a face area detecting process when the third determination unit 17 determines that the weight of at least one seat has changed.

The face area detecting unit 11, a first determination unit 12, a second determination unit 13, a warning output control unit 14, and the third determination unit 17 constitute a main part of the occupant detection device 100c.

Since the hardware configuration of the main part of the occupant detection device 100c is similar to that described with reference to FIG. 3 in the first embodiment, illustration thereof and description thereof will be omitted. That is, the function of the third determination unit 17 may be implemented by a processor 21 and a memory 22, or may be implemented by a processing circuit 23.

Figure 14B:
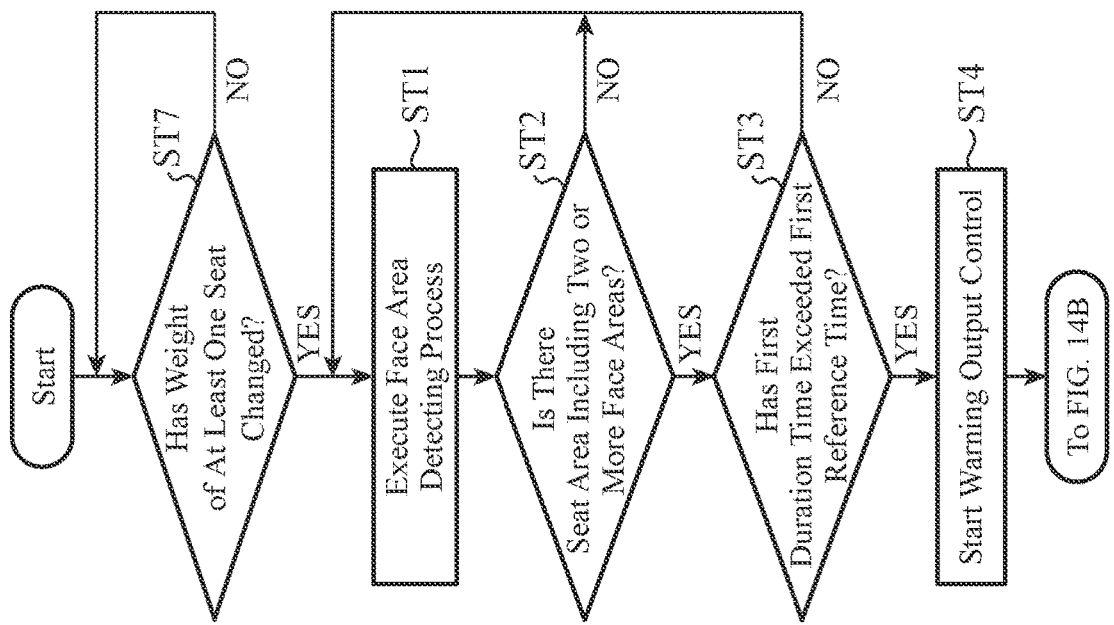
FIG. 14B is a flowchart illustrating another operation of the occupant detection device according to the fourth embodiment of the present invention.
Figure 14A:
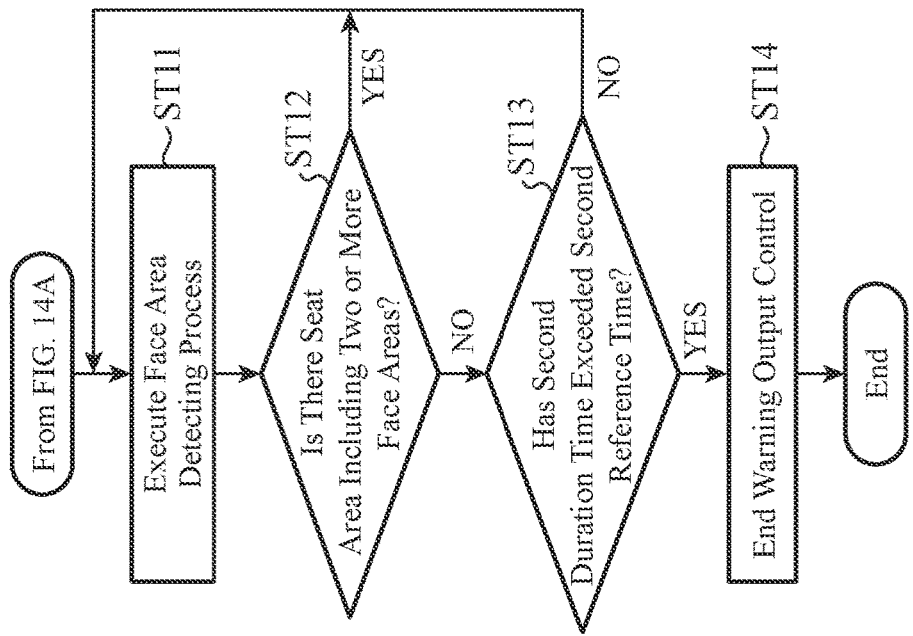
FIG. 14A is a flowchart illustrating an operation of the occupant detection device according to the fourth embodiment of the present invention.

Next, an operation of the occupant detection device 100c will be described with reference to the flowchart of FIG. 14. Note that in FIG. 14, the same reference numerals are given to steps similar to those illustrated in FIG. 4, and description thereof will be omitted.

First, in step ST7, the third determination unit 17 acquires a value detected by the weight sensor 4. The third determination unit 17 determines whether or not there is a change in the weight of each seat in the vehicle 1 using the acquired detection values. More specifically, the third determination unit 17 determines whether or not a detected value in each seat in the vehicle 1 has shifted from a stable state based on a first value to a stable state based on a second value.

If the third determination unit 17 determines that the weight of at least one seat has changed, more specifically, if the third determination unit 17 determines that a detection value in at least one seat has shifted from a stable state based on a first value to a stable state based on a second value ("YES" in step ST7), the process of the occupant detection device 100c proceeds to step ST1. As a result, the face area detecting unit 11 executes a face area detecting process (step ST1), and processes in step ST2 and later steps are executed.

Note that use of a value detected by the weight sensor 4 is not limited to the determination by the third determination unit 17. For example, the occupant detection device 100c may include a physique determination unit (not illustrated) for determining whether an occupant who has moved between seats is an adult or a child by comparing the amount of change in the weight of each seat in the vehicle 1 with a predetermined threshold.

For example, when a state where a child is seated on a child seat disposed in a certain seat (hereinafter, referred to as "first seat") shifts to a state where an adult seated on another seat (hereinafter, referred to as "second seat") is holding the child, the weight of the first seat decreases, and the weight of the second seat increases. At this time, both the amount of decrease in the weight of the first seat and the amount of increase in the weight of the second seat are values depending on the weight of the child and are values less than a threshold. The physique determination unit determines that the occupant who has moved from the first seat to the second seat is a child because these change amounts are less than a threshold.

The occupant detection device 100c may include a personal authentication unit 15 as in the occupant detection device 100a according to the second embodiment. In this case, the warning output control unit 14 may execute control for outputting a warning having content depending on a result of the personal authentication process by the personal authentication unit 15.

The occupant detection device 100c may include a face-to-face distance calculation unit 16 as in the occupant detection device 100b according to the third embodiment. In this case, the warning output control unit 14 may execute control for outputting a warning having content depending on a face-to-face distance calculated by the face-to-face distance calculation unit 16.

The occupant detection device 100c may include: a personal authentication unit 15 as in the occupant detection device 100a according to the second embodiment; and a face-to-face distance calculation unit 16 as in the occupant detection device 100b according to the third embodiment. In this case, the warning output control unit 14 may execute control for outputting a warning having content depending on a result of a personal authentication process by the personal authentication unit 15 and a face-to-face distance calculated by the face-to-face distance calculation unit 16.

In addition, the occupant detection device 100c can adopt various modifications similar to those described in the first embodiment.

Figure 15:
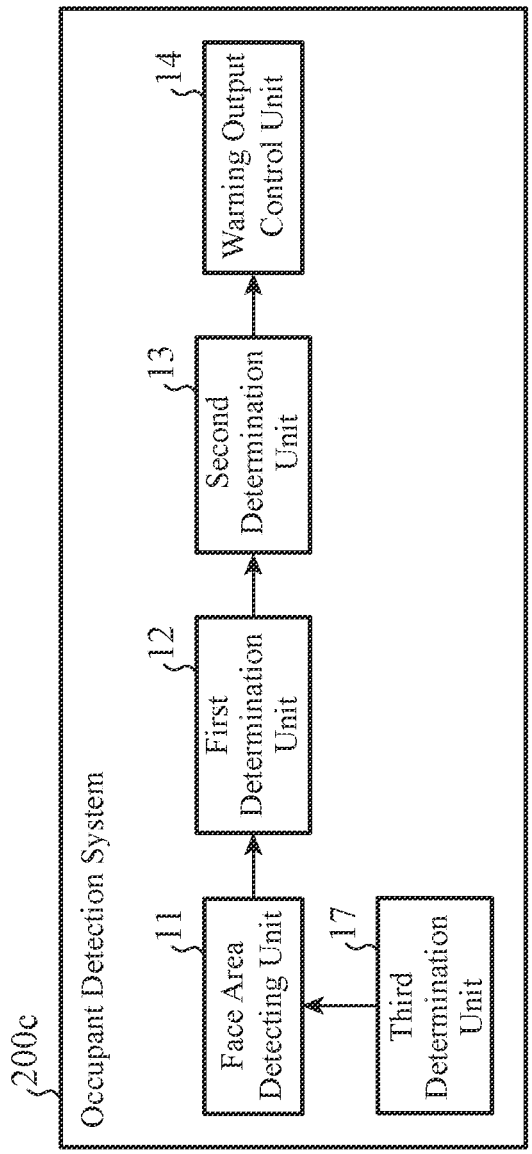
FIG. 15 is a block diagram illustrating a main part of an occupant detection system according to the fourth embodiment of the present invention.

As illustrated in FIG. 15, the face area detecting unit 11, the first determination unit 12, the second determination unit 13, the warning output control unit 14, and the third determination unit 17 may constitute a main part of an occupant detection system 200c.

Since the system configuration of the main part of the occupant detection system 200c is similar to that described with reference to FIG. 6 in the first embodiment, illustration thereof and description thereof will be omitted. That is, it is only required to implement the function of the occupant detection system 200c by cooperation of any two or more of an in-vehicle information device 31, a portable information terminal 32, and a server device 33.

As described above, the occupant detection device 100c according to the fourth embodiment includes the third determination unit 17 for determining whether or not there is a change in the weight of each of a plurality of seats using a value detected by the weight sensor 4 disposed in each of the plurality of seats, and the face area detecting unit 11 executes a process (face area detecting process) of detecting a plurality of face areas when the weight of at least one of the plurality of seats changes. This makes it possible to reduce an execution frequency of the face area detecting process. As a result, processing load on the processor 21 or the processing circuit 23 can be reduced.

Fifth Embodiment

Figure 16:
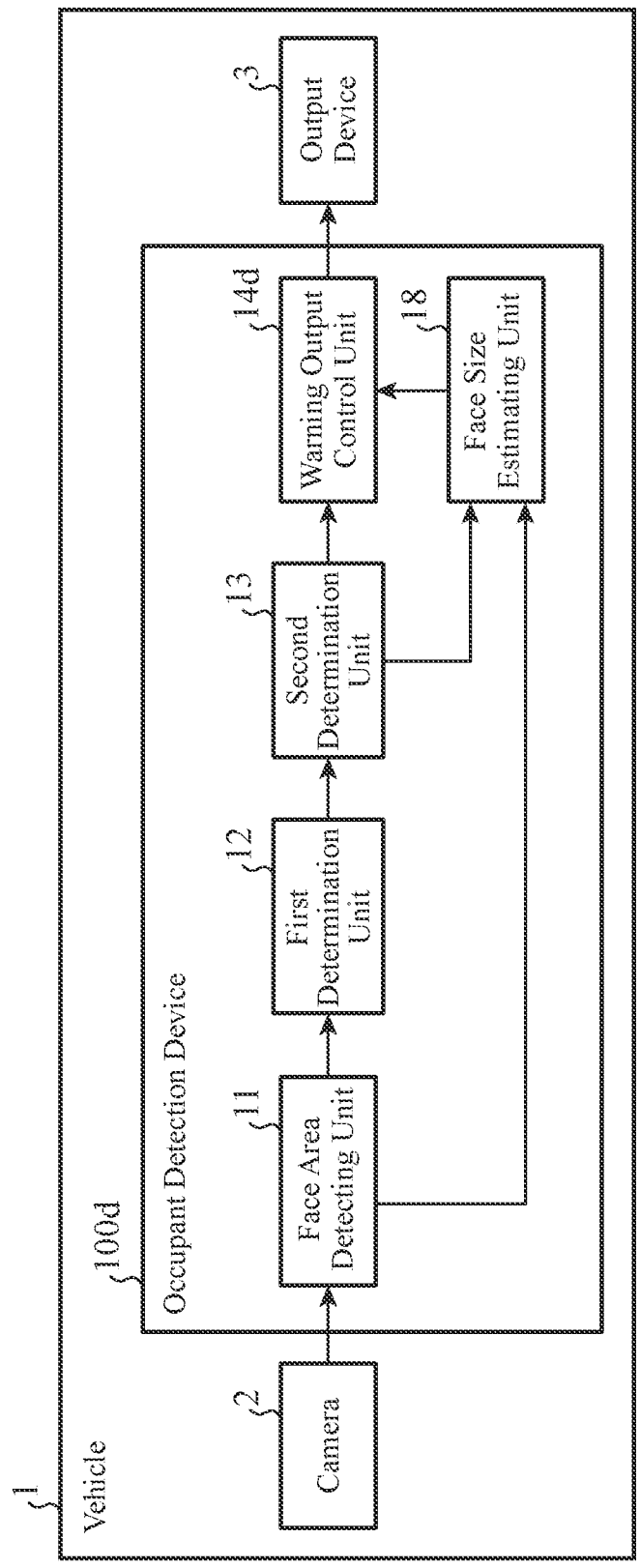
FIG. 16 is a block diagram illustrating a main part of an occupant detection device according to a fifth embodiment of the present invention.

FIG. 16 is a block diagram illustrating a main part of an occupant detection device according to a fifth embodiment. An occupant detection device 100d according to the fifth embodiment will be described with reference to FIG. 16. Note that in FIG. 16, the same reference numerals are given to blocks similar to those illustrated in FIG. 1, and description thereof will be omitted.

In a case where a first determination unit 12 determines that there is a seat area including two or more face areas, when a second determination unit 13 determines that a first duration time has exceeded a first reference time, a face size estimating unit 18 estimates the size of each of two or more faces (hereinafter, referred to as "face size") corresponding to the two or more face areas on a one-to-one basis.

Specifically, for example, the face size estimating unit 18 acquires information indicating the size of each of the two or more face areas (hereinafter, referred to as "face area size") from the face area detecting unit 11. Usually, the face area size is represented by a longitudinal pixel value and a lateral pixel value. The face size estimating unit 18 estimates the face size by converting the pixel value into a meter value. That is, the face size is a size in a real space.

The warning output control unit 14d executes control for outputting a warning having content depending on a result estimated by the face size estimating unit 18, that is, warning output control.

Specifically, for example, the warning output control unit 14d compares each face size estimated by the face size estimating unit 18 with a predetermined threshold. The threshold value is set to a value that makes it possible to identify whether a face corresponding to each face size is an adult face or a child face.

In a seat area including two or more face areas, when the size of a face corresponding to a face area located in an upper part is equal to or larger than a threshold, and the size of a face corresponding to a face area located in a lower part is less than the threshold, for example, the warning output control unit 14d causes a display to display a confirmation image including a message or the like prompting confirmation of presence or absence of a child held by an adult, or causes a speaker to output a confirmation voice including the message or the like. Alternatively, for example, the warning output control unit 14d causes a display to display a confirmation image including a message or the like prompting confirmation of presence or absence of a child being breastfed, or causes a speaker to output a confirmation voice including the message or the like.

Meanwhile, when this condition is not satisfied, the warning output control unit 14d cancels execution of the warning output control. For example, when all of two or more faces are adult faces, the face of an occupant in a rear seat may be reflected in a seat area corresponding to a front seat. In such a case, it is possible to avoid output of an unnecessary warning.

The face area detecting unit 11, the first determination unit 12, the second determination unit 13, the warning output control unit 14d, and the face size estimating unit 18 constitute a main part of the occupant detection device 100d.

Since the hardware configuration of the main part of the occupant detection device 100d is similar to that described with reference to FIG. 3 in the first embodiment, illustration thereof and description thereof will be omitted. That is, the function of the face size estimating unit 18 may be implemented by a processor 21 and a memory 22, or may be implemented by a processing circuit 23.

Figure 17B:
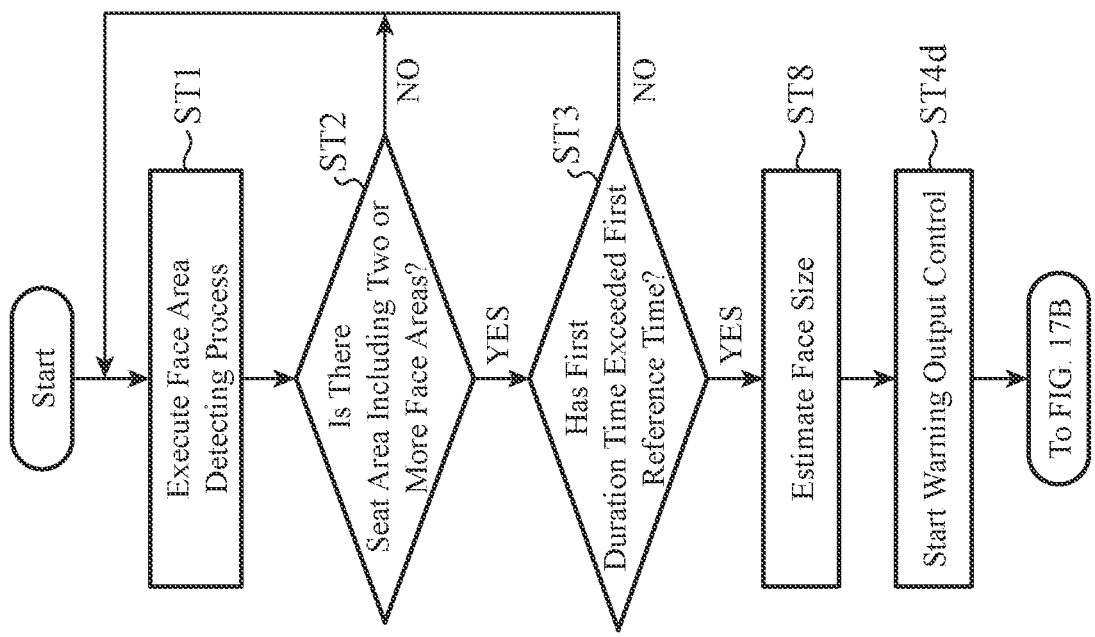
FIG. 17B is a flowchart illustrating another operation of the occupant detection device according to the fifth embodiment of the present invention.
Figure 17A:
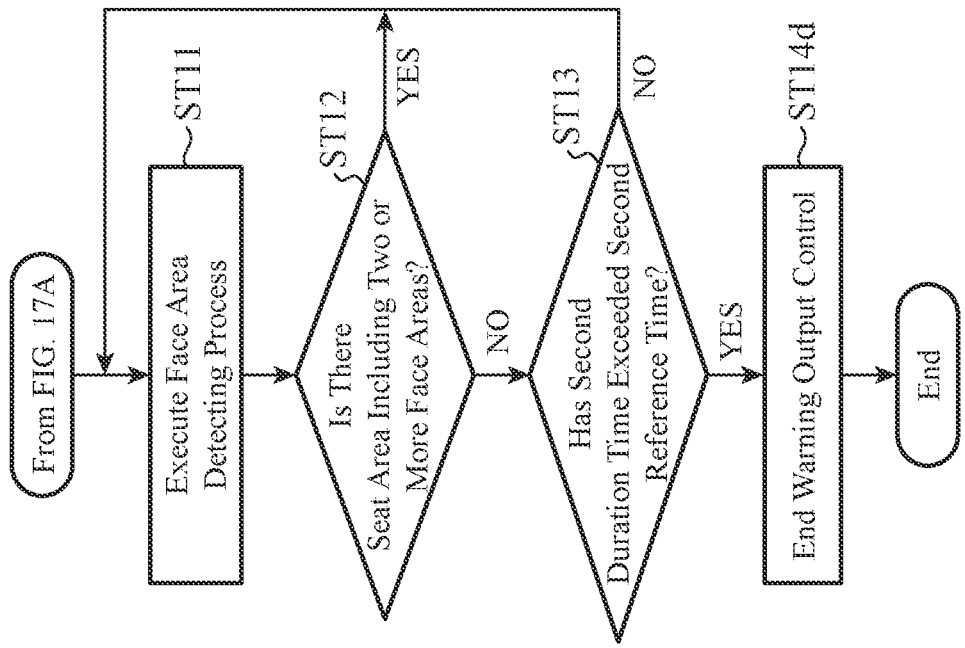
FIG. 17A is a flowchart illustrating an operation of the occupant detection device according to the fifth embodiment of the present invention.

Next, an operation of the occupant detection device 100d will be described with reference to the flowchart of FIG. 17. Note that in FIG. 17, the same reference numerals are given to steps similar to those illustrated in FIG. 4, and description thereof will be omitted.

In a case where the first determination unit 12 determines that there is a seat area including two or more face areas ("YES" in step ST2), if the second determination unit 13 determines that the first duration time has exceeded the first reference time ("YES" in step ST3), the face size estimating unit 18 estimates a face size (step ST8). Since a specific example of a method for estimating a face size has been described above, the description thereof will not be repeated.

Next, in step ST4d, the warning output control unit 14d starts control for outputting a warning having content depending on the face size estimated in step ST8, that is, warning output control. Since a specific example of the warning output control by the warning output control unit 14d has been described above, the description thereof will not be repeated. Thereafter, in step ST14d, the warning output control unit 14d ends the warning output control.

Note that the warning output control unit 14d only needs to execute control for outputting a warning having content depending on a result estimated by the face size estimating unit 18. The content of the message included in the confirmation image or the confirmation voice are not limited to the above specific example.

The occupant detection device 100*d* may include a personal authentication unit 15 as in the occupant detection device 100*a* according to the second embodiment. In this case, the warning output control unit 14*d* may execute control for outputting a warning having content depending on a result of a personal authentication process by the personal authentication unit 15 and a result estimated by the face size estimating unit 18.

The occupant detection device 100*d* may include a face-to-face distance calculation unit 16 as in the occupant detection device 100*b* according to the third embodiment. In this case, the warning output control unit 14*d* may execute control for outputting a warning having content depending on a face-to-face distance calculated by the face-to-face distance calculation unit 16 and a result estimated by the face size estimating unit 18.

The occupant detection device 100*d* may include: a personal authentication unit 15 as in the occupant detection device 100*a* according to the second embodiment; and a face-to-face distance calculation unit 16 as in the occupant detection device 100*b* according to the third embodiment. In this case, the warning output control unit 14*d* may execute control for outputting a warning having content depending on a result of a personal authentication process by the personal authentication unit 15, a face-to-face distance calculated by the face-to-face distance calculation unit 16, and a result estimated by the face size estimating unit 18.

The occupant detection device 100*d* may include a third determination unit 17 as in the occupant detection device 100*c* according to the fourth embodiment.

In addition, the occupant detection device 100*d* can adopt various modifications similar to those described in the first embodiment.

Figure 18:
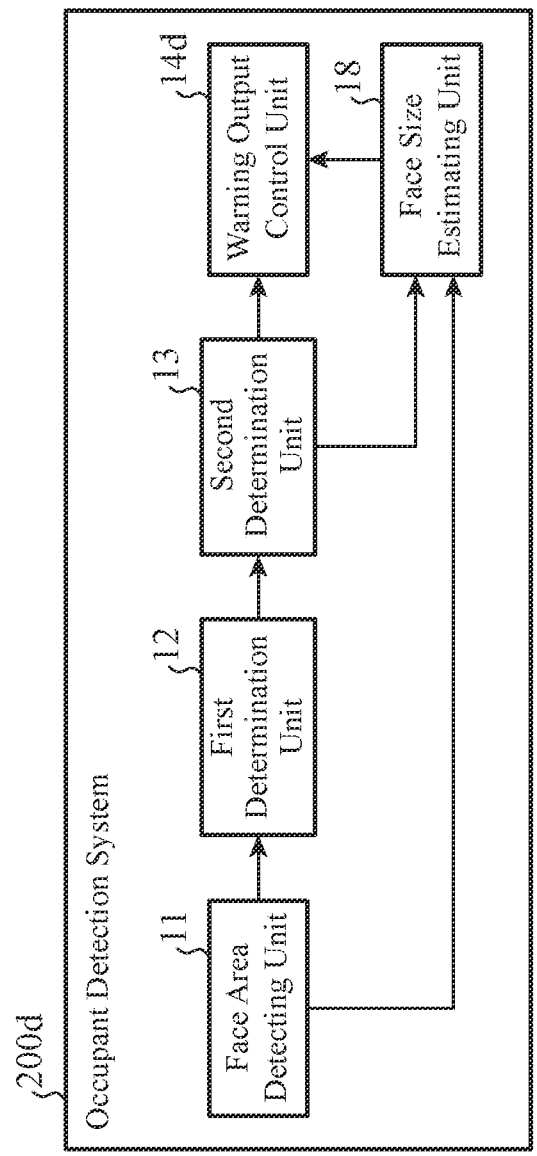
FIG. 18 is a block diagram illustrating a main part of an occupant detection system according to the fifth embodiment of the present invention.

As illustrated in FIG. 18, the face area detecting unit 11, the first determination unit 12, the second determination unit 13, the warning output control unit 14*d*, and the face size estimating unit 18 may constitute a main part of the occupant detection system 200*d*.

Since the system configuration of the main part of the occupant detection system 200*d* is similar to that described with reference to FIG. 6 in the first embodiment, illustration thereof and description thereof will be omitted. That is, it is only required to implement the function of the occupant detection system 200*d* by cooperation of any two or more of an in-vehicle information device 31, a portable information terminal 32, and a server device 33.

As described above, the occupant detection device 100*d* according to the fifth embodiment includes the face size estimating unit 18 for estimating the size (face size) of each of two or more faces corresponding to two or more face areas, and the warning output control unit 14*d* executes control (warning output control) for outputting a warning having content depending on a result estimated by the face size estimating unit 18. As a result, when there is a high probability that an adult is holding a child, a mother or the like is breast-feeding a child, or the like, a warning including a message having more specific content can be output.

Note that the present invention can freely combine the embodiments to each other, modify any constituent element in each of the embodiments, or omit any constituent element in each of the embodiments within the scope of the invention.

INDUSTRIAL APPLICABILITY

The occupant detection device of the present invention can be applied to, for example, an occupant monitoring system for a vehicle.

REFERENCE SIGNS LIST

1: Vehicle,
2: Camera,
3: Output device,
4: Weight sensor,
11: Face area detecting unit,
12: First determination unit,
13: Second determination unit,
14, 14*a*, 14*b*, 14*d*: Warning output control unit,
15: Personal authentication unit,
16: Face-to-face distance calculation unit,
17: Third determination unit,
18: Face size estimating unit,
21: Processor,
22: Memory,
23: Processing circuit,
31: In-vehicle information device,
32: Portable information terminal,
33: Server device,
100, 100*a*, 100*b*, 100*c*, 100*d*: Occupant detection device, and
200, 200*a*, 200*b*, 200*c*, 200*d*: Occupant detection system

The invention claimed is:

1. An occupant detection device comprising:
processing circuitry
to detect a plurality of face areas corresponding to a plurality of faces in an image captured by a camera for capturing an image of a vehicle interior;
to determine whether or not, among a plurality of seat areas corresponding to a plurality of seats in the captured image, there is a seat area including two or more face areas;
to determine whether or not a duration time of a state where there is a seat area including the two or more face areas has exceeded a reference time; and
to output a warning when the duration time exceeds the reference time.

2. The occupant detection device according to claim 1, wherein
the processing circuitry executes a personal authentication process on each of two or more faces corresponding to the two or more face areas, and
executes control for outputting the warning having content depending on a result of the personal authentication process.

3. The occupant detection device according to claim 1, wherein
the processing circuitry calculates a distance between two or more faces corresponding to the two or more face areas, and
executes control for outputting the warning having content depending on the calculated distance.

4. The occupant detection device according to claim 1, wherein
the processing circuitry determines whether or not there is a change in a weight of each of the plurality of seats using a value detected by a weight sensor disposed in each of the plurality of seats, and
detects the plurality of face areas when a weight of at least one of the plurality of seats changes.

5. The occupant detection device according to claim 1, wherein
the processing circuitry estimates a size of each of two or more faces corresponding to the two or more face areas, and
executes control for outputting the warning having content depending on the estimated result.

6. An occupant detection system comprising:
processing circuitry
to detect a plurality of face areas corresponding to a plurality of faces in an image captured by a camera for capturing an image of a vehicle interior;
to determine whether or not, among a plurality of seat areas corresponding to a plurality of seats in the captured image, there is a seat area including two or more face areas;
to determine whether or not a duration time of a state where there is a seat area including the two or more face areas has exceeded a reference time; and
to execute control for outputting a warning when the duration time exceeds the reference time.

7. An occupant detection method comprising:
detecting a plurality of face areas corresponding to a plurality of faces in an image captured by a camera for capturing an image of a vehicle interior;
determining whether or not, among a plurality of seat areas corresponding to a plurality of seats in the captured image, there is a seat area including two or more face areas;
determining whether or not a duration time of a state where there is a seat area including the two or more face areas has exceeded a reference time; and
executing control for outputting a warning when the duration time exceeds the reference time.

* * * * *